(12) United States Patent
Ferraro et al.

(10) Patent No.: US 12,078,548 B2
(45) Date of Patent: Sep. 3, 2024

(54) ELECTRICAL APPARATUS THERMAL MONITORING

(71) Applicant: Schneider Electric Industries SAS, Rueil-Malmaison (FR)

(72) Inventors: Venanzio Ferraro, Grenoble (FR); Massimo Secci, Savona (IT); Diego Alberto, Corenc (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 576 days.

(21) Appl. No.: 17/313,290

(22) Filed: May 6, 2021

(65) Prior Publication Data

US 2021/0356328 A1 Nov. 18, 2021

(30) Foreign Application Priority Data

May 13, 2020 (EP) ..................................... 20174518

(51) Int. Cl.
*G01K 1/02* (2021.01)
*G01K 1/024* (2021.01)
*G01K 1/14* (2021.01)
*G06N 5/02* (2023.01)
*H02J 13/00* (2006.01)

(52) U.S. Cl.
CPC .............. *G01K 1/02* (2013.01); *G01K 1/024* (2013.01); *G01K 1/14* (2013.01); *G06N 5/02* (2013.01); *H02J 13/00002* (2020.01)

(58) Field of Classification Search
CPC ............ G01K 1/02; G01K 1/024; G01K 1/14; G01K 7/42; G01K 13/00; G01K 7/02; G01K 7/22; G06N 5/02; H02J 13/00002; G01M 99/002
See application file for complete search history.

(56) References Cited

U.S. PATENT DOCUMENTS 10,132,692 B2 * 11/2018 Cano Rodriguez ...... G01K 1/08

FOREIGN PATENT DOCUMENTS

EP      3223382 A1    9/2017
WO   2019157619 A1    8/2019

OTHER PUBLICATIONS

Extended European Search Report dated Oct. 14, 2020 for European Patent Application No. EP20174518.9-1001, 8 pages.

* cited by examiner

*Primary Examiner* — Walter L Lindsay, Jr.
*Assistant Examiner* — Geoffrey T Evans
(74) *Attorney, Agent, or Firm* — Locke Lord LLP

(57) ABSTRACT

Monitoring the condition of an electrical apparatus based on an estimated temperature of a conductor in the electrical apparatus, including receiving a measured temperature value from a first thermal sensor disposed in the electrical apparatus and configured to sense temperature at a location separated from the conductor by an insulator, generating an estimated conductor temperature value based on applying a non-linear model to the measured temperature value, and monitoring the condition of the electrical apparatus based on the estimated conductor temperature. The non-linear model may include a Hammerstein Wiener model.

18 Claims, 7 Drawing Sheets

FIG. 4A
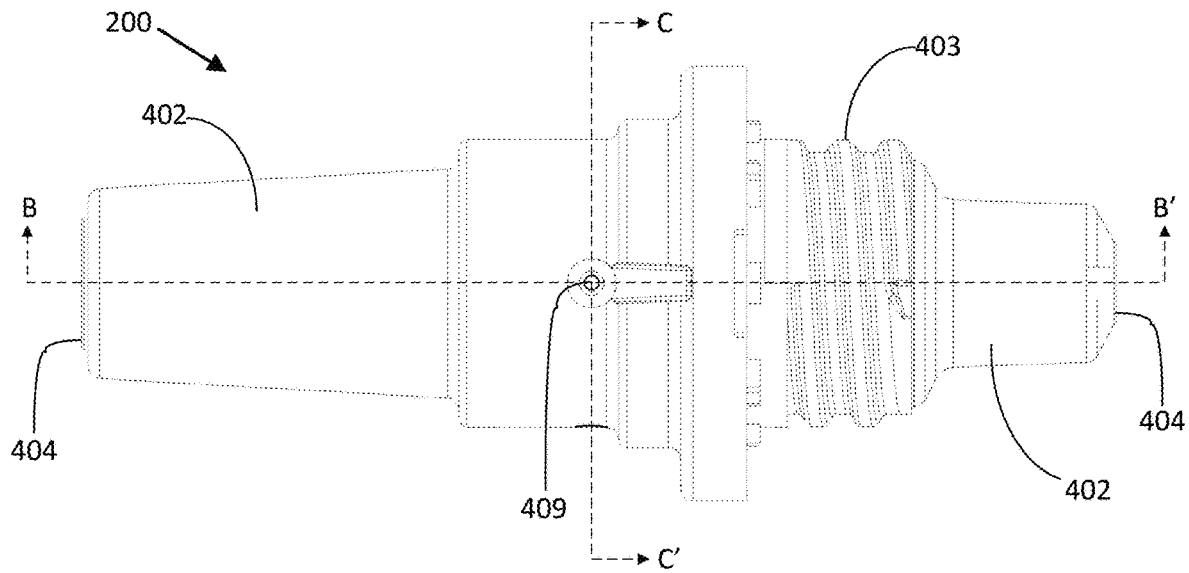
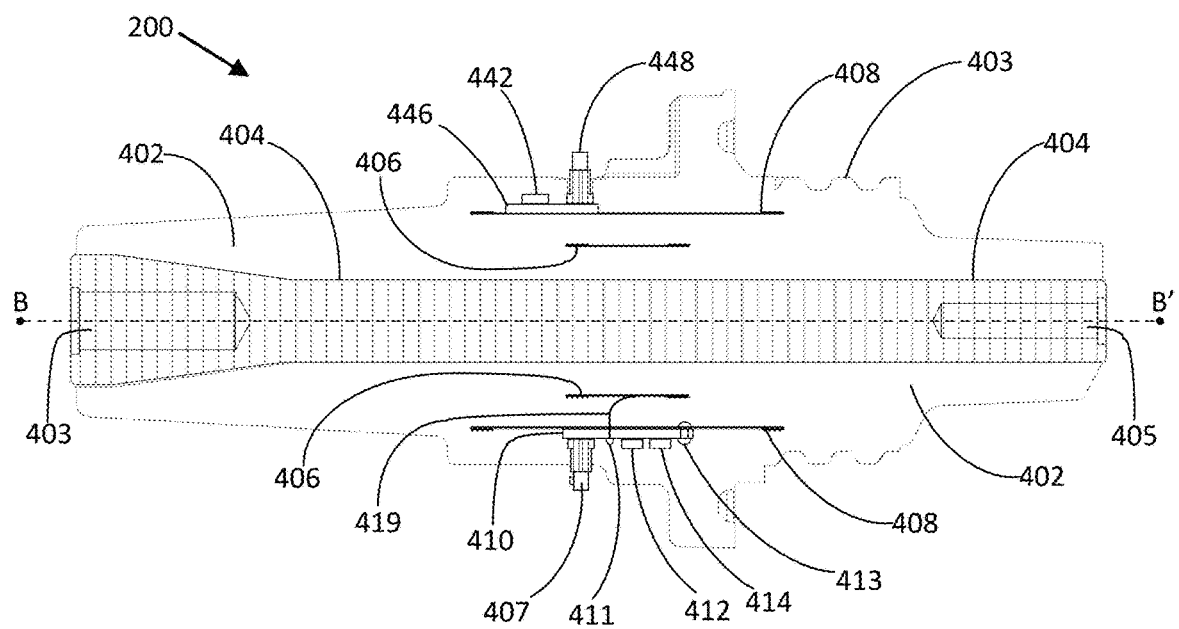
FIG. 4B

ELECTRICAL APPARATUS THERMAL MONITORING

BACKGROUND

The present disclosure relates to thermal monitoring of electrical distribution systems, and more particularly, to monitoring the temperature of conductors embedded in an insulating body of an electrical component of an electrical distribution system, some embodiments of which are particularly well-suited for monitoring and/or failure prevention of current-carrying components and/or conductive interfaces therebetween in high-voltage (HV) and/or medium-voltage (MV) environments, such as in MV switchgear, controlgear, and power transformer.

Temperature monitoring in an electrical system can be an important indicator of component lifetime, potential for component failure, and/or component service requirements. For instance, high temperature operation of medium-voltage switchgear, controlgear, and power transformer is generally well correlated with an increased failure likelihood and concomitantly a decreased operational lifetime (e.g., decreased mean time to failure). Accordingly, temperature monitoring of likely failure points in MV switchgear, controlgear, and power transformer may provide for early detection of potential failures, allowing for maintenance scheduling to avoid switchgear failure, and thus minimize or avoid down-time as well as prevent further consequential losses, damages, costs, and possible human injury that may result from switchgear failure.

Electrical failure points of particular concern in MV switchgear are the MV current-carrying conductors and connections, such as busbars, feeders, conductors within bushings, as well as connections between bushings and separable connectors or cable terminations as well as connections between bushings and electrical equipment. These conductors and connections generally degrade over time (e.g., increased conductor or contact resistance due to corrosion or oxidation, which is exacerbated by higher temperature operation, which may be due to excessive loads), and such degradation may result in further excessive heating (due to higher conductor/connection resistance), which in turn exacerbates degradation. Accordingly, temperature sensors are used within switchgear for detecting and monitoring the temperature of the conductors and connections, for detecting problems/events or potential problems that may require action, such as maintenance. As temperature sensors must not undermine the integrity of the current-carrying conductors, they are generally not mounted in contact with the conductor but instead are mounted on, or sometimes at some point within, the cable or connector insulator. Thus, the temperature measured by the temperature sensors do not provide the actual temperature of the conductor, but instead provide a representation of the conductor temperature.

Accordingly, there remains a need for improved thermal monitoring devices, systems, and methods for estimating the temperature of conductors in electrical systems, including such improvements that are applicable to the medium voltage conductors and associated connectors within MV switchgear.

SUMMARY OF SOME ILLUSTRATIVE EMBODIMENTS

Some embodiments according to the present disclosure provide methods and systems for thermal monitoring of an electrical apparatus, such as a medium voltage switchgear, controlgear, or power transformer, wherein temperature of a conductor may be accurately estimated, including during short rise-time and transient intervals of the conductor temperature, based on a non-linear model and a temperature measured by a temperature sensing element separated from the conductor by an insulator.

In some embodiments, a method for monitoring the condition of an electrical apparatus based on an estimated temperature of a conductor in the electrical apparatus comprises receiving a measured temperature value from a first thermal sensor disposed in the electrical apparatus and configured to sense temperature at a location separated from the conductor by an insulator; generating an estimated conductor temperature value based on applying a non linear model to the measured temperature value; and monitoring the condition of the electrical apparatus based on the estimated conductor temperature.

In some embodiments, the non linear model may comprise a Hammerstein Wiener model, and a zero phase low-pass filter applied to the output of the Hammerstein Wiener model.

In some embodiments, the first thermal sensor is embedded in a bushing, and the conductor may be a conductive rod of the bushing, wherein the conductive rod is configured for electrical connection to a second conductor external to the bushing.

The electrical apparatus may be a medium voltage switchgear, which may include at least one processor that executes the method for monitoring the condition of the switchgear based on the estimated temperature of the conductor in the electrical apparatus.

In some embodiments, at least one non-transitory computer-readable medium comprises code that, when executed by at least one processor, is operative to cause the at least one processor execute at least one or more of the methods described above.

In some embodiments, a monitor apparatus is configured to monitor the condition of an electrical apparatus based on an estimated temperature of a conductor in the electrical apparatus, and comprises a memory and at least one processor. The memory is configured to store a measured temperature value generated by a first thermal sensor disposed in the electrical apparatus and configured to sense temperature at a location separated from the conductor by an insulator. The at least one processor is configured to generate an estimated conductor temperature value based on applying a non-linear model to the measured temperature value, the estimated conductor measurement value being representative of the temperature of the conductor. The at least one processor is further configured to monitor the condition of the electrical apparatus based on the estimated conductor temperature.

It will be appreciated by those skilled in the art that the foregoing brief description and the following description with respect to the drawings are illustrative and explanatory of some embodiments of the present invention, and are neither representative nor inclusive of all subject matter and embodiments within the scope of the present invention, nor intended to be restrictive or characterizing of the present invention or limiting of the advantages which can be achieved by embodiments of the present invention, nor intended to require that the present invention necessarily provide one or more of the advantages described herein with respect to some embodiments. Thus, the accompanying drawings, referred to herein and constituting a part hereof, illustrate some embodiments of the invention, and, together with the detailed description, serve to explain principles of some embodiments of the invention.

BRIEF DESCRIPTION OF THE DRAWINGS

Aspects, features, and advantages of some embodiments of the invention, both as to structure and operation, will be understood and will become more readily apparent in view of the following description of non-limiting and non-exclusive embodiments in conjunction with the accompanying drawings, in which like reference numerals designate the same or similar parts throughout the various figures, and wherein:

FIG. 4A is an illustrative schematic top view of an illustrative bushing comprising an embedded thermal temperature sensing element, and two sensor electrodes, in accordance with some embodiments;

FIGS. 4B and 4C schematically depict illustrative orthogonal cross-sectional views of the bushing depicted in FIG. 4A, in accordance with some embodiments;

DETAILED DESCRIPTION OF SOME ILLUSTRATIVE EMBODIMENTS

Figure 1:
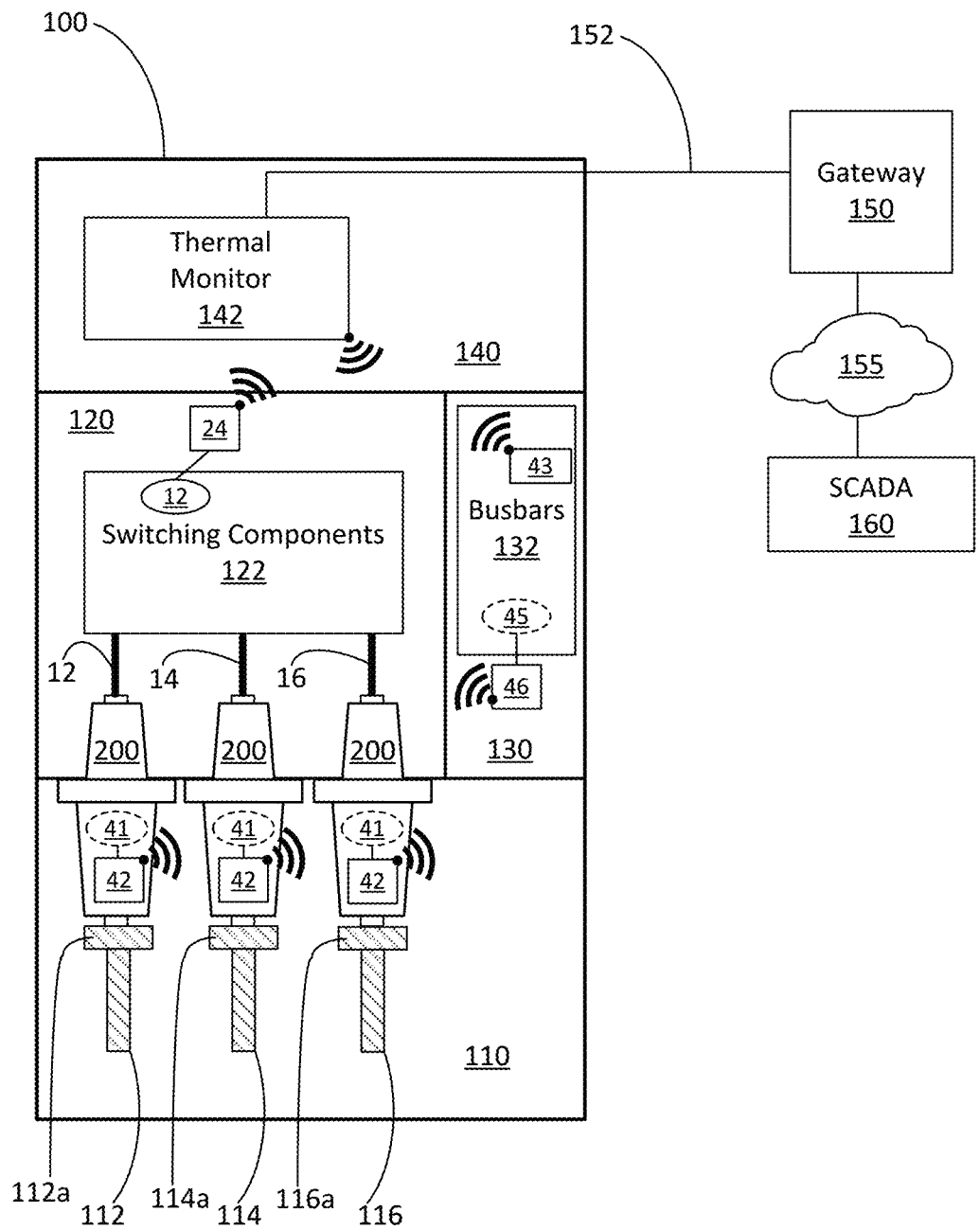
FIG. 1 depicts a block diagram of an illustrative system that may be configured to implement thermal monitoring, in accordance with some embodiments.

Throughout the description and claims, the following terms take at least the meanings explicitly associated herein, unless the context dictates otherwise. The meanings identified below do not necessarily limit the terms, but merely provide illustrative examples for the terms.

The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

In addition, as used herein, unless the context clearly dictates otherwise, the term "coupled" refers to directly connected or to indirectly connected through one or more intermediate components and, in some contexts, may also denote or include electrically coupled, such as conductively coupled, capacitively coupled, and/or inductively coupled. Further, "conductively coupled (connected)," "electrically coupled (connected)," and "galvanically coupled (connected)," and similar variants, each refer to being coupled (connected) via one or more intermediate components that permit energy transfer via conduction current, which is capable of including direct current as well as alternating current, while "capacitively coupled" refers to being electrostatically coupled through one or more dielectric media, and possibly also via one or more intervening conductors (e.g., via a series of capacitive components), that permit energy transfer via displacement current and not via direct current between the coupled (connected) components. Those skilled in the art will further understand that elements may be capacitively coupled intentionally or unintentionally (e.g., parasitically) and that in some contexts, elements said to be capacitively coupled may refer to intentional capacitive coupling. In addition, those skilled in the art will also understand that in some contexts the term "coupled" may refer to operative coupling, through direct and/or indirect connection. For instance, a conductor (e.g., an electrode or a wire, etc.) said to be coupled to a relay may refer to the conductor being operable to selectively cause operation of the relay (e.g., switching/triggering), regardless of whether the conductor is connected to the relay indirectly (e.g., via intermediary passive and/or active circuitry, etc.) and/or directly.

In addition, it will be understood that terminology such as "top," "upper," "bottom," "lower," "side," and the like, as used herein is a convention simply for convenience and ease of reference with respect to referring to the various views presented in the drawings, and does not otherwise impart any limitation on the overall design and/or orientation of dual-voltage capacitive sensor in accordance with the present disclosure.

Further, for ease of reference, as used herein, the term "sensor electrode" refers to an electrically conductive electrode, having sufficient electrical conductivity to function as a capacitor electrode in the context of the present disclosure. Similarly, for ease of reference, as used herein, the term "conductive" or "conductor" refers to electrically conductive or an electrical conductor (rather than, for example, thermal conductivity (though most good electrical conductors are also known to be good thermal conductors), unless the context clearly dictates otherwise. In this regard, it will be further understood that the term "conductor," as used herein, refers to the electrical conductivity of a material or component (e.g., in contrast to an insulator or dielectric) and not to whether the material or component is actively conducting current or even configured to conduct current, though some conductors may be configured for conducting current. Thus, for example, a bushing's central conductive rod, which is configured to be connected—and conduct electrical current—between a cable supplied by medium or high voltage source and another electrical component may be referred to as a conductor, regardless of whether the central conductive rod is conducting current or otherwise connected to the cable and electrical component. Likewise, however, by way of example, a central conductive rod may also be referred to as a conductor in other components (e.g., an LPVT or insulator) wherein the central conductive rod is not configured to conduct electrical current therethrough but is configured to function solely as an electrode (e.g., configured for electrical connection to a busbar supplied by a medium or high voltage source without conducting current supplied by the medium or high voltage source). Accordingly, it is understood that an "electrode," as used herein, is a conductor configured to not carry conduction current; so, for example, the central conductive rod of a bushing is not an electrode.

It is further noted that for convenience and conciseness, reference herein to measuring, monitoring, or estimating the temperature of a conductor not only includes reference to cables and busbars or other conductors, but also refers to measuring, monitoring, or estimating the temperature of connections or terminations (e.g., interfaces or contact points between cables, busbars, equipment, etc.).

For clarity, while the terms medium-voltage and high-voltage may have different definitions in various standards, or otherwise may be understood as having different meanings in various contexts, as used herein, medium-voltage may refer to an alternating current (AC) root-mean-square (rms) voltage in the range of about 1 KV to about 52 KV or to a direct current (DC) voltage in the range of about 1.5 KV to about 75 KV; and high-voltage may refer to an alternating current (AC) rms voltage greater than about 52 KV or to a direct current (DC) voltage greater than about 75 KV. As may be understood by the ensuing disclosure, however, embodiments in accordance with the present disclosure are not limited to a particular voltage or voltage range.

As will be further understood in view of the ensuing description, some embodiments in accordance with the present disclosure provide a method, system, and apparatus for estimating the temperature in a medium-voltage or high-voltage conductor based on a non-linear model that processes measurement data received from a thermal sensor configured to sense the temperature of an insulator that is thermally coupled to the conductor. In some embodiments, the conductor and insulator are configured as a bushing, with the conductor embedded in and extending through the insulator, and the thermal sensor embedded in the insulator and disposed near the conductor. The non-linear model may be generated based on data sets acquired from calibration testing comprising measuring the insulator temperature with the thermal sensor configured as to be used in the field, and measuring the conductor temperature using a second temperature sensor in direct thermal contact with the conductor, while controlling the heat applied to the conductor, such as by a heating element placed in thermal contact with the conductor.

In this regard, the present inventors have recognized that temperature transients in, for example, medium-voltage switchgear conductors provide meaningful information (e.g., such as for condition-monitoring and failure prediction and prevention), but such conductor temperature transients are neither detected (nor measurable) nor estimated by conventional, known switchgear thermal monitoring systems. For instance, it may be understood that temperature profiles (i.e., temperature versus time) measured by temperature sensors may have reduced slopes (e.g., rise-time, fall-time) and reduced amplitudes compared to the actual conductor temperature profile due to thermal diffusion and dissipation, as temperature sensors do not directly measure the conductor temperature but instead measure the temperature of an electrical insulator in thermal contact with the conductor, or other material (e.g., conductor) separated from the conductor by an electrical insulator (e.g., which generally have low thermal conductivity). These discrepancies generally become more pronounced with increased rates of change of the conductor temperature and, as confirmed by the present inventors, cannot be adequately accounted for by linear estimators. In addition, these discrepancies may be further magnified for thermal sensor configurations characterized by a slower step response based on, for example, the proximity of the thermal sensor to the conductor (e.g., considering the thermal impedance between conductor and sensor, the thermal impedance of other heat dissipation paths, etc.). Moreover, modeling inadequacy and/or inaccuracy may be exacerbated by thermal sensor and surrounding environment/component configurations that subject the temperature sending element to, e.g., correlated (e.g., non-random) noise sources or other conditions that may not or cannot be suitably accounted for by the model. Accordingly, as noted, such limitations of known thermal monitoring systems amounts to a loss of meaningful information.

Figure 6:
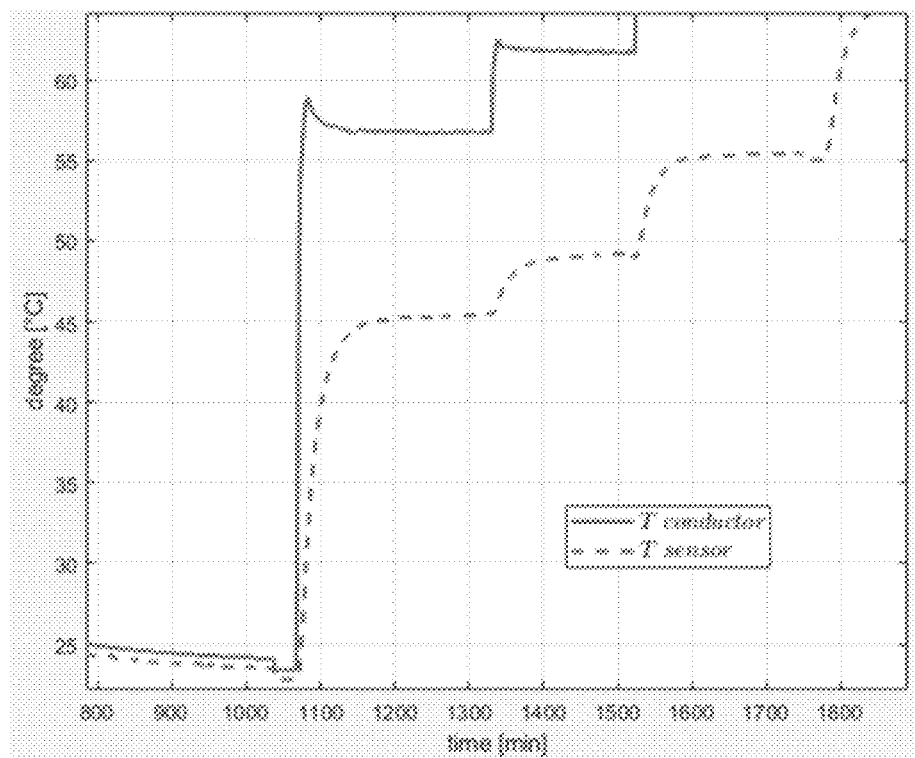
FIG. 6 graphically depicts the results of an experimental test comparing the directly measured temperature of a conductor of a medium-voltage bushing with the temperature measured by a thermal sensor embedded in the epoxy resin insulator of the bushing, in accordance with some embodiments.

An illustrative example of the information loss is illustrated by FIG. 6, which shows the results of an experimental test comparing the directly measured temperature of a conductor of a medium-voltage bushing with the temperature measured by a thermal sensor embedded in the epoxy resin insulator of the bushing, while controlling the heating power to a resistive-heater thermally coupled to a conductor connected to the bushing's conductor. It is noted that in this test, the bushing—including the embedded thermal sensor—was configured in accordance with some embodiments further described hereinbelow.

As can be seen in FIG. 6, there is a significant amplitude and rise-time discrepancy between the actual conductor temperature and the temperature measured by the thermal sensor disposed within the bushing. It is further noted that the amplitude and rise-time discrepancies that would be measured by conventional thermal monitoring systems would likely be even greater, at least because the bushing used in the described test was configured to enhance the responsivity of the embedded thermal sensor compared to known thermal monitoring system configurations, many of which employ surface-mounted thermal sensors, which are generally farther from the conductor, and thus subject to lower heat flux and greater lag and damping due to the greater distance and associated heat dissipation. In other words, the responsivity of the thermal sensor as demonstrated in FIG. 6 itself represents an improvement over known thermal monitoring via bushings, but nonetheless demonstrates information loss with respect to temperature transients. As further described hereinbelow, however, the improved responsivity provided by such a bushing configuration (i.e., which is in accordance with some embodiments according to the present disclosure) acquires sufficient information for facilitating accurate estimation of the conductor temperature, including temperature transients such as those illustrated in FIG. 6, based on a non-linear model.

Referring now to FIG. 1, a block diagram is depicted of an illustrative system that may be configured to implement thermal monitoring in accordance with some embodiments. It will be understood by those skilled in the art, however, that features are generally represented in block diagram form and, for clarity, not all features or details of such a system are shown, including, for example, various electrical components, connections, connectors, associated equipment, and the like. It will be further understood by those skilled in the art in view of the ensuing disclosure that while illustrative embodiments herein are set forth, by way of example, in the context of switchgear, alternative embodiments according to the present disclosure may be directed to other electrical apparatus such as controlgear and power transformers.

As shown, the illustrative system includes a switchgear cabinet 100 communicably coupled to a gateway 150 via a bus 152 and to a SCADA system 160 via gateway 150 and network 155. Bus 152 may be implemented, for example, as an Industrial Ethernet communications bus or as a RS485 bus using Modbus protocol. Network 155 may comprise, for example, a local area network (LAN) and/or a wide area network (WAN; such as the Internet). SCADA (i.e., supervisory control and data acquisition) system 150 may comprise one or more control stations (e.g., personal computer based) and human machine interfaces (HMIs), and may be implemented in accordance with well-known SCADA systems for automated monitoring and control of switchgear 100 and related equipment and devices, as well as analytics, and managing preventive maintenance scheduling (e.g., condition-based maintenance) based on acquired (including historical) data, trend data, and lifetime/failure models.

Switch cabinet 100 includes a cable compartment 110, a switching component compartment 120, a busbar compartment 130, and a low-voltage compartment 140. As schematically illustrated, each of three bushings 200 is mounted between the cable compartment and the switching compartment 120. Each bushing 200 has a center conductor, one end of which is connected to a respective feeder cable 112, 114, 116 via a respective connector 112a, 114a, 116a (e.g., T-body connectors), and the other end of which is connected to a respective component (not shown) of switching components 122 via a respective conductor 12, 14, and 16.

As known to those skilled in the art, switching components 122 may comprise components such as a circuit-breaker, a switch-disconnector, and an earthing switch, and busbars 132 may be shielded conductors mounted on insulators and connected (not shown) to switching components 122.

Each bushing 200 includes an embedded temperature sensing element 41, such as a thermistor (e.g., a Negative Temperature Coefficient (NTC) silistor) or a thermocouple, connected to a thermal sensor module 42, which may be mounted on or near the bushing 200. Similarly, in busbar compartment 130, a temperature sensing element 45 coupled to a thermal sensor module 46 may be embedded in, for example, an insulator surrounding or supporting the busbar or otherwise forming part of a component electrically and thermally connected to the busbar (e.g., a low-power voltage transformer (LPVT), such as a capacitive-divider LPVT). In switching compartment 120, a temperature sensing element 12 is depicted as being mounted on a switching component and coupled to thermal sensor module 42. In various implementations, as illustrated by thermal sensor 43, a thermal sensor may comprise a temperature sensing element (e.g., thermistor) and the components of a thermal sensor module integrated in a unitary package that may be mounted or installed for thermal monitoring (e.g., thermal sensor 43 may be mounted on an insulator that encapsulates a busbar).

In some embodiments, thermal sensor module 42 may include circuitry for exciting temperature sensing element 21 (if required, depending on the temperature sensing element), reading out and storing a signal from temperature sensing element 21, and communicating with temperature module 142 over a wired (e.g., electrical and/or optical) and/or wireless communication medium. Wireless technologies that may be used include, for example, Zigbee, WiFi, BLE (Bluetooth Low Energy), and RFID. For instance, thermal sensor module 42 may be implemented as a microcontroller together with a communications integrated circuit or as an ASIC (application specific integrated circuit).

In some embodiments, sensor module 42 may include circuitry for wirelessly powering the module (e.g., without requiring external wired power) by inductively harvesting energy from the alternating current (e.g., 50 Hz or 60 Hz) passing through bushing 200, or from a radio-frequency (RF) signal transmitted by thermal monitor 142 (e.g., RFID interrogation signal) or another RF source via one or more antennas located within switchgear cabinet 100 (e.g., an antenna located in cable compartment 110), and converting the harvested AC or RF energy to direct current (DC) power. Alternatively or additionally, sensor module 42 may be powered by batteries, or by a wired power connection.

As may be understood from the foregoing, it may be noted that the term thermal sensor, as used herein (and consistent with its use in the art), may refer to at least a temperature sensing element (e.g., a thermistor, or thermocouple, etc.), such as temperature sensing element 41; for example, in some contexts, thermal sensor may refer to a temperature sensing element alone, while in some contexts thermal sensor may refer to a temperature sensor together with associated circuitry for excitation (if the temperature sensing element requires excitation) and readout, and possibly other functions as well (e.g., wireless powering; communication, etc.).

Thermal monitor 142 is configured to receive temperature measurement data acquired by each of the thermal sensors. More specifically, in this illustrative embodiment, thermal monitor receives temperature measurement data wirelessly (e.g., using Zigbee) from modules 42, modules 24 and 26, and thermal sensor 43. In some embodiments, each of the sensors may initiate transmission of the temperature sensor data to thermal monitor 142. Such transmissions may be initiated periodically (e.g., at regular intervals, such as approximately every minute, or at irregular intervals, such as upon the sensed temperature having changed by a given amount since the previous temperature sensor data transmission by the sensor (i.e., temperature sensor data upload). Alternatively or additionally, thermal monitor 142 may initiate thermal sensor data uploading from the thermal sensors (e.g., using Zigbee, WiFi, or by way of RFID interrogation, etc., depending on the implementation).

In various embodiments, thermal monitor 142 may be configured to process the received temperature measurement data to, for example, estimate the temperature of a conductor based on a non-linear model in accordance with some embodiments, as further described hereinbelow. Thermal monitor 142 may also communicate the acquired temperature data and/or the estimated conductor temperature data to SCADA system 160, which may alternatively or additionally be configured to estimate the temperature of a conductor based on a non-linear model in accordance with some embodiments.

Figure 2:
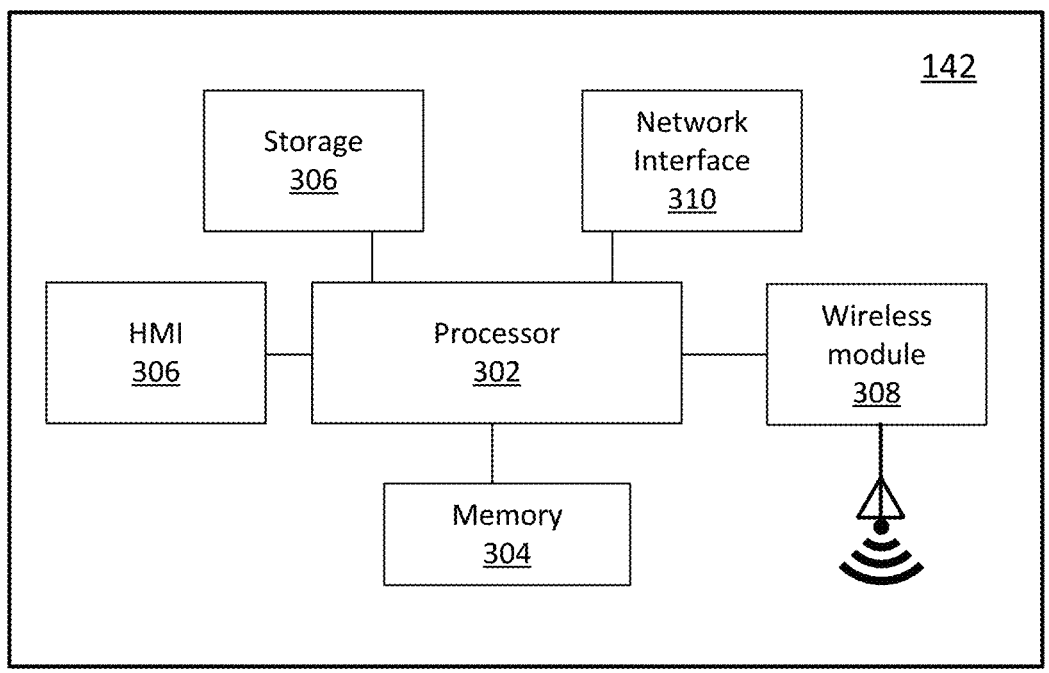
FIG. 2 schematically depicts an illustrative embodiment of thermal monitor in general block-diagram form, in accordance with some embodiments.

FIG. 2 schematically depicts an illustrative embodiment of thermal monitor 142 in general block-diagram form. In this regard, those skilled in the art will understand that various depicted components, as described, may in practice be implemented as separate integrated circuits or combined on a common integrated circuit (e.g., as an ASIC, and/or a microcontroller, off-the-shelf chip sets, etc.) depending on the components, their functionality, and/or their compatibility for integration as a common component or integrated circuit, etc. As shown, thermal monitor 142 may include a processor 302, memory 304, storage 306, wireless module 308, network interface 310, and human-machine interface (HMI) 306.

Processor 302 may, for example, include one or more processor cores, and may access memory 304 (e.g., random access memory, RAM, such as static and/or dynamic RAM) during execution of code that may be stored in storage 306. For example, as noted, in some embodiments, processor 302 may execute code to estimate the conductor temperature based on the thermal sensor temperature measurement data and a non-linear model. During such execution, memory 304 may store at least some of the code and data associated with the non-linear model, such data including non-linear model parameters (e.g., coefficients) as well as the thermal sensor temperature measurement data. Memory 304 may also comprise a read-only memory (ROM, such as EEPROM) or FLASH memory.

Storage 306 may comprise non-volatile memory (e.g., FLASH memory) and/or may comprise solid-state storage (e.g. a solid-state drive comprising FLASH memory) and/or other non-volatile storage device or storage medium. Storage 306 may store the non-linear model code and data (e.g., parameters, such as coefficients) for execution of the non-linear model code by processor 302.

Wireless module 308 comprises circuitry (e.g., analog, digital, and/or mixed-mode, including any associated stored code, etc.), such as baseband and transceiver circuitry, for communicating with the thermal sensors, and in some embodiments may comprise one or more off-the-shelf integrated circuits or cores (e.g., for Zigbee, or WiFi).

Network interface 310 comprises circuitry (e.g., including hardware and any associated firmware to implement physical and datalink layers) for communication via bus 152 (e.g., according to Modbus and/or Industrial Ethernet or other IP network protocols). As described, in various embodiments, thermal monitor 142 may communicate estimated conductor temperature data to SCADA system 160 via network interface 310.

In addition, via network interface 310, thermal monitor 142 may receive information (e.g., firmware updates, non-linear model updates, etc.) from SCADA system 160 to be stored in the storage 306 and/or memory 304 (e.g., in Flash). For example, thermal monitor 142 may receive updates for the non-linear model, such as updated coefficients and/or constants used in the model. Such updating of the non-linear model allows for continuously improving the accuracy of the conductor temperature estimation. For example, the non-linear model may be updated as it is improved and/or updated based on, for example, thermal sensor data aggregated and analyzed by the SCADA system from switchgear 100 and other thermal sensors (e.g., in other switchgear cabinets associated with switchgear 100 and/or which may be remote from switchgear 100).

In some alternative embodiments, however, the non-linear model may be stored remotely, such as in an SCADA system 160, and the processor 302 may communicate thermal sensor data via the network interface 310 to the SCADA system 160, which then may apply the non-linear model (as further described below) to estimate the conductor temperature. If the estimated conductor temperature data may be indicative of certain conditions or events (e.g., potential connection failure and/or maintenance required), SCADA system 160 may communicate appropriate information to thermal monitor 142 for display or alarm via HMI 306. Alternatively or additionally, SCADA system 160 may notify certain operators and other personnel via the SCADA system and/or other communication platforms (e.g., email, text, etc.).

HMI 306 may be used to visually display temperature data acquired by the thermal sensors and/or conductor temperature estimated according to execution of the non-linear model. HMI 306 may further display associated alerts, notifications (e.g., scheduled maintenance), and/or alarm conditions based on the estimated conductor temperature. HMI 306 may also provide audible alarms, and may permit for user-input (e.g., via a menu-driven interface permitting users to select or configure the displayed information, access stored data, etc.).

Figure 3A:
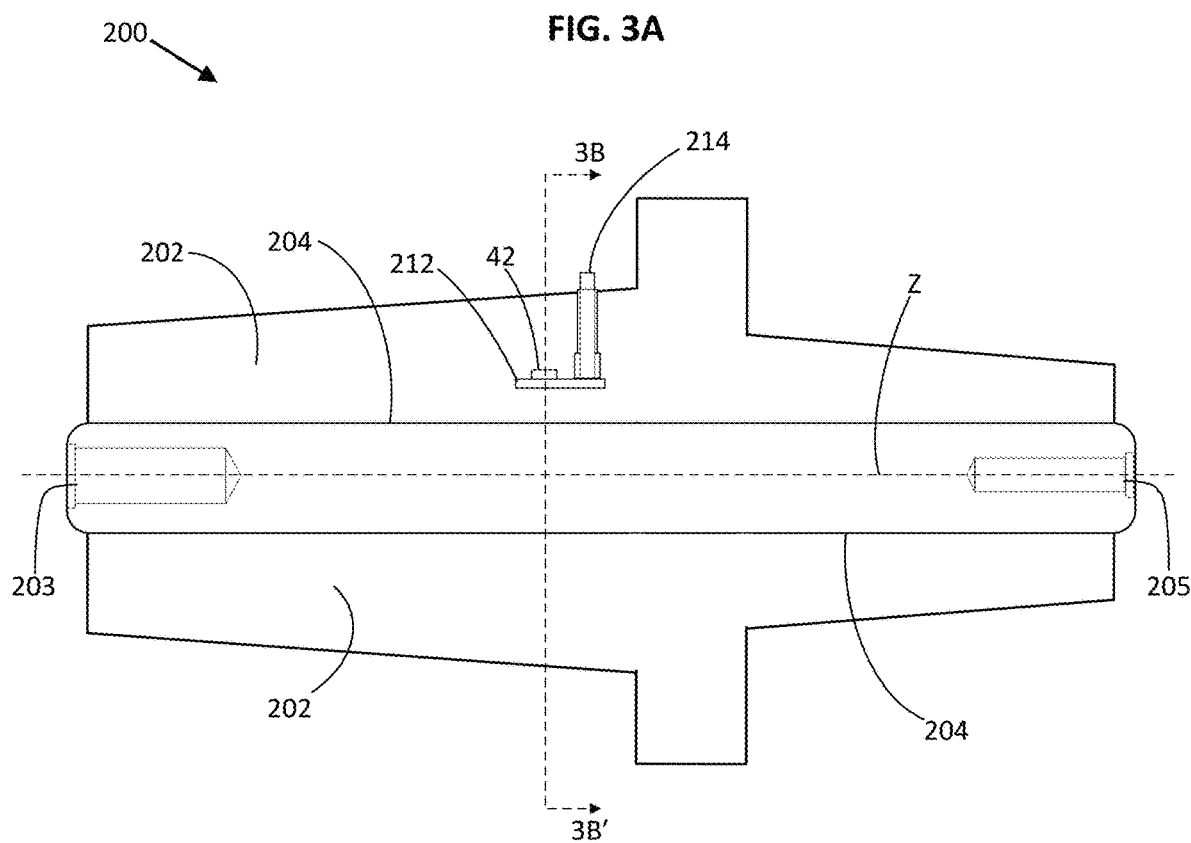
FIGS. 3A and 3B schematically depict orthogonal cross-sectional views of an illustrative bushing comprising an embedded thermal temperature sensing element, in accordance with some embodiments.
Figure 3B:
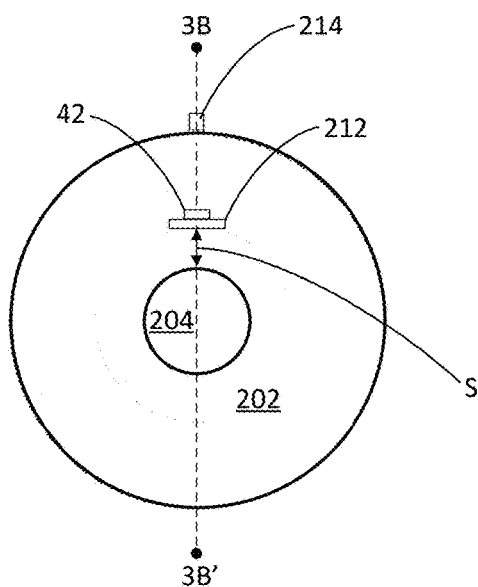

FIGS. 3A and 3B schematically depict orthogonal cross-sectional views of an illustrative bushing 200 comprising an embedded thermal temperature sensing element in accordance with some embodiments according to the present disclosure. Although this illustrative embodiment is directed to a bushing having an embedded temperature sensing element, in view of the present disclosure, those skilled in the art will understand that some embodiments according to the present disclosure are not limited to employing an embedded temperature sensing element nor to implementing embedded sensors only within bushings. For instance, some embodiments may employ surface-mounted temperature sensing elements, while some embodiments may implement embedded sensors within other components, such as separable connectors (e.g., T-body connectors, elbow connectors), back plugs of T-body connectors, insulators such as post insulators, standalone low-power voltage transformers (LPVTs; e.g., such as may be conductively coupled to a switchgear bus bar).

More specifically, bushing 200 has a generally cylindrical shape, and FIG. 3A is a cross-sectional view of bushing 200 into a plane that contains longitudinal (cylindrical) axis Z along and at the center of central conductor 204, and FIG. 3B is a cross-sectional view of bushing 200 at the longitudinal position and in the direction identified by reference arrows 3B-3B' in FIG. 3A. As shown, in some embodiments illustrative bushing 200 may comprise the following: an insulating body 202; a conductor 204 that extends between opposite longitudinal ends of the bushing and includes openings 203 and 205 for connection to external conductors (e.g., feeder cable 112, and conductor 12 in FIG. 1); a printed circuit board (PCB) 212 embedded in insulating body 202; a temperature sensing element 41 (e.g., a thermistor) mounted on PCB 212; and an electrical connector 204 mounted on PCB 212 and having a portion exposed to the exterior of insulating body 202, and having terminals electrically connected to temperature sensing element 41, such that a thermal sensor module (such as module 42 in FIG. 1) may be connected to electrical connector 204 for excitation (if required by temperature sensing element 41) and readout of temperature sensing element 41.

In accordance with some embodiments, by way of non-limiting illustrative example, PCB 212 may have a thickness of about 1 mm, the radial separation between the surface of PCB 212 facing conductor 204 and conductor 204 may preferably be between about 8 mm and 14 mm, and the distance between temperature sensing element 41 and the opening 203 end of conductor 204 that is configured to form a contact surface between bushing 200 and an external conductor connected thereto (e.g., via T-body connector 112a in FIG. 1a) may be between about 10 mm and 90 mm, so as to provide relatively low thermal impedance (e.g., compared to surface-mounting) between temperature sensing element 42 and conductor 204 (and its end portion configured to form a contact surface with an external conductor), while also ensuring the integrity and reliability (e.g., with respect to partial discharge) of the intervening dielectric material comprising insulating body 202. In some embodiments, the surface of PCB 212 facing conductor 204 is plated with metal, so as to provide shielding of temperature sensing element 41 from electric fields generated by the conductor 204.

Figure 4C:
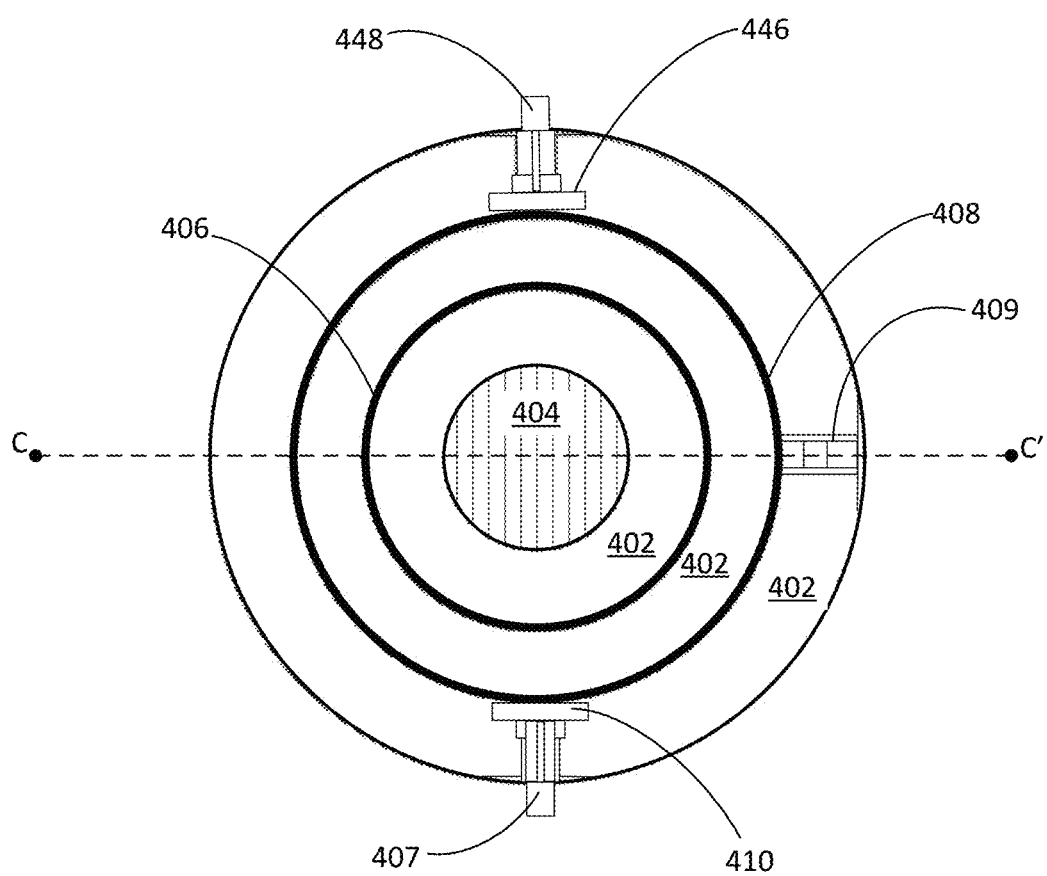

FIGS. 4A-C schematically depict a top view and cross-sectional views of an illustrative alternative embodiment of bushing 200 comprising a plurality of embedded capacitive voltage sensors in combination with an embedded temperature sensing element in accordance with some embodiments according to the present disclosure. Although this illustrative embodiment is directed to a bushing, in view of the present disclosure, those skilled in the art will understand that embodiments of a dual-voltage capacitive sensor and an embedded temperature sensor in accordance with the present disclosure are not limited to bushings, and include but are not limited to alternative and additional implementations such as separable connectors (e.g., T-body connectors, elbow connectors), back plugs of T-body connectors, post insulators, and standalone low-power voltage transformers (LPVTs; e.g., such as may be conductively coupled to a switchgear busbar).

More specifically, FIG. 4A is a top view of bushing 200, FIG. 4B is a cross-sectional view of illustrative bushing 200 in the direction identified by reference arrows B-B' (FIG. 2A) into a plane that contains axis 401 and is perpendicular to reference arrows B-B', and FIG. 4C is a cross-sectional view of bushing 200 in the direction identified by reference arrows C-C' (FIG. 4A) into a plane that contains axis 401 and is perpendicular to reference arrows C-C'.

As shown in FIGS. 4A-C, in some embodiments illustrative bushing 200 may have a generally cylindrical shape about axis 101 and comprise the following: an insulating body 402 having an external threaded portion 403 for mounting the bushing; a conductor 404 that extends between opposite longitudinal ends of the bushing and includes openings 403 and 405 for connection to external conductors; a cylindrical-shell-shaped sensor electrode 406 spaced away from and generally coaxial with conductor 404; a cylindrical-shell-shaped sensor electrode 408 spaced away from and surrounding and generally coaxial with sensor electrode 406; a printed circuit board (PCB) 410 mounted on sensor electrode 408 via fastener 413; a solder joint 411 formed on PCB 410 to electrically connect thereto one end of a conductor 419 (e.g., an insulated wire) that passes through an aperture or opening in sensor electrode 408 and an aperture or opening through PCB 410, and has an opposite end electrically connected (e.g., soldered) to sensor electrode 406; parallel-connected or series-connected capacitors 412 and 414 (e.g., film chip capacitors) mounted on PCB 410 and having a first common terminal thereof conductively coupled to solder joint 411 (and thus to sensor 406); a connector 407 mounted on PCB 410 and having a portion exposed to the exterior of insulating body 402, and having an inner conductor conductively coupled to solder joint 411 (and thus to sensor electrode 406 and to the first terminal of connected capacitors 412 and 414), and having an outer shield conductor conductively coupled to a second terminal of connected capacitors 412 and 414; and a connector 409 electrically connected to sensor electrode 408 and having a portion exposed to the exterior of insulating body 402.

Bushing 200 also comprises a temperature sensing element 442 (e.g., a surface mount end-banded chip thermistor) mounted on a printed circuit board 446, which may be mounted on sensor electrode 408 (e.g., similar to PCB 410). A connector 448 electrically connected to temperature sensing element 442 may be mounted on PCB 446 and extend externally to insulating body 402 to provide for connecting temperature sensing element 442 to excitation (e.g., if excitation required) and voltage readout circuitry (e.g., thermal sensor module 42). In some alternative embodiments, the connectors 407, 409, and 448 may be approximately equally spaced around the bushing circumference (e.g., separated azimuthally by 120 degrees, with the PCBs repositioned accordingly) at the same longitudinal position and/or one or more of the connectors may be displaced longitudinally at varying azimuths. In addition to temperature monitoring for estimation of conductor temperature, in some embodiments the temperature measurement signal may be used (e.g., if necessary) to compensate (e.g., based on pre-calibration) for temperature-dependent variations in the capacitive voltage divider transfer function. In accordance with some embodiments (such as the illustrative embodiment of FIGS. 4A-C), however, such compensation may not be required, even for precision voltage measurement, due to capacitors 412 and 414 preferably being embedded within insulating body 402 and having a temperature coefficient sufficiently comparable to that of sensor electrode 406.

Sensor electrode 406 and conductor 404 effectively form a capacitor that is connected in series with the parallel-connected or series-connected capacitors 412 and 414, such that the signal provided across the inner and outer conductors of connector 407 is a voltage-divided representation of the voltage of conductor 404. In addition, sensor electrode 408 and conductor 404 effectively form a capacitor, and sensor electrode 408 is configured both (i) to provide an output signal at connector 409 representing a separate measurement of the voltage of conductor 404 (corresponding to its capacitive coupling to conductor 404), and (ii) to shield electrode 406 from external electric fields. Such external electric fields may, for example, include near-field and/or quasi-static or low frequency fields (such as may be generated by nearby phases), as well as higher frequency electromagnetic fields. Such shielding by floating sensor electrode 408 facilitates accurate sensing by electrode sensor 406 of the electric field generated by conductor 404, thus facilitating accurate measurement of the conductor 404 voltage (e.g., such as may be required for metering and/or protection; such as IEC Accuracy Class 0.5).

As indicated, floating sensor electrode 408 not only shields electrode 406 from external fields, but also provides an additional and independent output signal (at connector 407) representing the voltage on conductor 404. This independent output signal may be used, for example, for voltage presence indication (e.g., for safety, such as in accordance with the IEC 62271-206 standard). Thus, in various implementations, a censored bushing or insulator according to some embodiments of the present disclosure may provide both VPIS and precision LPVT output signals, along with a temperature sensing element output, without necessarily requiring embedding a dedicated electric field shield (e.g., a grounded screen surrounding the LPVT sensor) within the bushing. It is further noted that floating sensor electrode 408 also provide shieldings of temperature sensing element 442 from electric fields generated by the conductor 204.

Referring again to FIGS. 4A-4C, it may be understood that in some embodiments such as the presently described illustrative bushing 200, insulating body 402 may substantially encapsulate sensor electrodes 406 and 408 (e.g., surrounding the electrodes—including the annular region between sensors 406 and 408—except for the portion of sensor electrode 408 on which connector 409 is mounted. In addition, insulating body 402 may substantially encapsulate conductor 404 (e.g., surrounding conductor 404, except for the end portions of conductor 404 that are accessible at the exterior ends of bushing 200 for connection to external conductors), thereby encapsulating at least the portion of conductor 404 facing sensors 406 and 408. Further, insulating body 402 may substantially encapsulate temperature sensing element 442. Insulating body 102 may be composed of one or more dielectric materials, such as an epoxy resin (e.g., ARALDITE®) (including, for example, cycloaliphatic epoxy resin), a polyurethane resin, a PTFE resin (e.g. TEFLON®), a ceramic, or other suitable insulating materials. In some embodiments, bushing 200 may be formed by performing a molding process (e.g., gravity casting process or automatic gelation process (APG)) to encapsulate or substantially encapsulate the components shown in FIGS. 4A-C in insulating body 402.

Although preferably embedded within insulating body 102, in some alternative embodiments capacitors 412 and 414 (or, e.g., their equivalent individual discrete capacitance) may be implemented external to insulating body 402, such as in voltage measurement circuitry or, alternatively, in an external module that may be removably connected directly to connector 407 and that includes an additional connector for coupling to voltage measurement circuitry. Additionally, although (as indicated above) capacitors 412 and 414 may be implemented as surface-mount film chip capacitors mounted on a PCB, alternative implementations may, for example, employ one or more PCB-embedded capacitors, or a capacitor embedded in insulating body 402 but not mounted on a printed circuit board.

As described, in some embodiments conductor 404 may include openings 403 and 405 for connection to external conductors, such as to an incoming feeder cable and to electrical equipment in the apparatus in which bushing 200 is disposed (e.g., switchgear). As such, openings 403 and 405 (and, e.g., the surrounding end portions of insulating housing 402) may be configured according to various interface connections. For instance, in some embodiments, opening 403 and/or opening 405 may be threaded for connection by way of a bolt or a threaded pin.

In some embodiments, sensor electrodes 406 and 408 may be configured as substantially coaxial cylindrical conductors (e.g., which may be referred to as hollow cylindrical electrodes or cylindrical-shell electrodes). The longitudinal ends of sensor electrodes 406 and 408 may be rounded, such as by folding over the ends thereof. The longitudinal extent and diameter of each sensor electrode may be designed based on, for example, desired or required capacitive coupling of electrodes 406 and 408 to each other and to conductor 404 to provide outputs at connectors 407 and 409 with the desired electrical characteristics (e.g., voltage division, precision, and/or capacitance; as will be further understood in view of the ensuing disclosure), reliability (e.g., such as in view of leakage current, dielectric breakdown, etc.), and sufficient shielding by electrode 408 of electrode 406 from external electric fields. The dimensions (e.g., diameters) and design (e.g., shape, apertures, as described below) may also account for positioning thermal temperature sensing element 442 such that the conductor temperature may be reliably and accurately estimated based on a non-linear model in accordance with some embodiments further described below.

Either or both of sensor electrodes 406 and 408 (whether configured as cylindrical shells or other geometric shapes) may be formed with an open mesh or screen structure, which may not only allow for ready insertion of conductor 419 through electrode 408, but may also improve bushing reliability as well as fabrication yield. For instance, during the molding process, such an open mesh or screen structure may readily permit free-flow of the material (e.g., epoxy resin) used to form insulating body 402 through the sensor electrodes, thereby facilitating conformal coverage. In some embodiments, a mesh or screen structure may be formed by coating a plastic mesh with a conductor, or by molding a conductive plastic that includes a conductive filler, such as nickel-coated graphite filler in nylon. In some embodiments, for example, one or more of electrodes 406 and 408 may be formed as a continuous conductive sheet structure (e.g., formed from sheet metal), possibly patterned and machined or etched to include one or more apertures and/or slots formed therein. Electrodes 406 and 408 may be formed from any of various sufficiently conductive materials, such as aluminum, brass, copper, or other metals or metal alloys.

Although sensor electrodes 406 and 408 are depicted in the illustrative embodiment of FIGS. 4A-C as having a uniform radius, in some embodiments the radius of either or both of electrodes 406 and 408 may vary longitudinally (e.g., monotonically tapered over at least some extent). In some embodiments, electrode 406 and possibly also electrode 408 may not form a complete cylinder around conductor 404. For instance, electrode 406 may partially surrounding conductor 404.

By way of non-limiting example for purposes of illustration only, in some embodiments employing ARALDITE® or similar synthetic resin for insulating body 402, the conductor 404 diameter may be about 20 mm within the sensor region, the radial separation between conductor 404 and sensor electrode 406 may be at least 4 mm and preferably at least 8 mm, the radial separation between electrode 406 and 408 may be at least about 4 mm and preferably not more than about 12 mm, and each electrode sensor 406 and 408 may have a nominal thickness of 1 mm, corresponding to the radial separation between conductor 104 and temperature sensing element 442 being at least about 8 mm and preferably not greater than about 22 mm.

In view of the foregoing disclosure together with the ensuing description of estimating conductor temperature based on a non-linear model and a temperature sensed by a temperature sensing element separated from the conductor by an insulator, it will be further understood that the illustrative bushings described hereinabove are particularly configured and well-suited to facilitate providing reliable and accurate estimates of the conductor temperature (including the end portion of conductor 402 configured to form a contact surface between bushing 200 and an external conductor connected thereto (e.g., via T-body connector 112a in FIG. 1a)) based on such a non-linear model and sensed temperature. For example, embedding temperature sensing element 442 within insulating body 402 provides for the temperature sensing element 442 (i) to be in good and reliable thermal contact with insulating body 402, and further (ii) to be thermally coupled to conductor 204 (and its end portion comprising opening 403 configured to form a contact surface with an external conductor) internally via a controlled, hermetically sealed, fixed thermal path that does not include separable components or additional interfaces. In other words, a configuration such as provided by bushing 200 provides a controlled thermal system that is well-suited for reliable and accurate estimation in accordance with methods described in the ensuing disclosure.

Nonetheless, it will also be understood in view of the present disclosure that embodiments for monitoring the condition of an electrical apparatus based on an estimated conductor temperature generated based on a non-linear model and a temperature sensed by a temperature sensing element separated from the conductor by an insulator are not limited to the temperature sensing element being embedded in a bushing, nor to being embedded.

Figure 5:
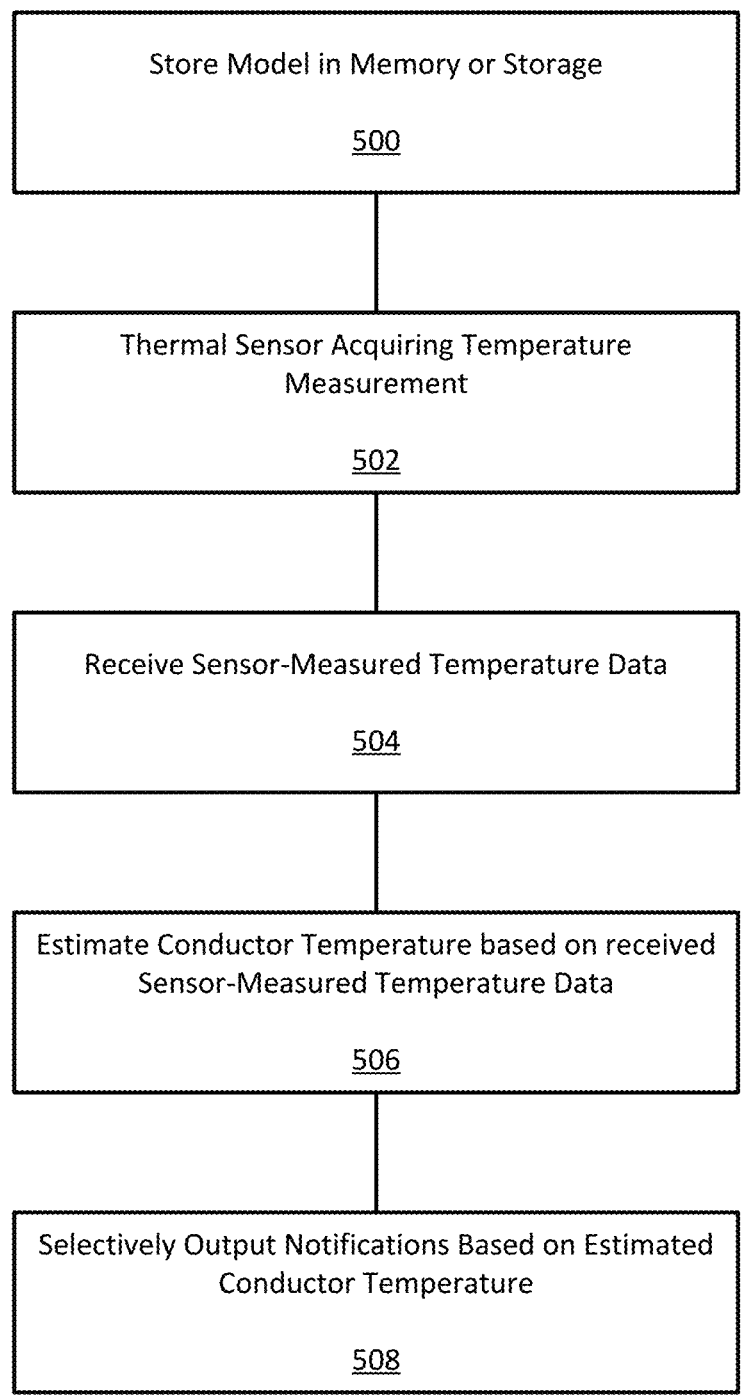
FIG. 5 is a flowchart setting forth illustrative steps for implementing a method of monitoring the condition of an electrical apparatus based on an estimated temperature of a conductor in the electrical apparatus, in accordance with some embodiments.

FIG. 5 is a flowchart setting forth illustrative steps for implementing a method according to some embodiments of the present disclosure of monitoring the condition of an electrical apparatus based on an estimated temperature of a conductor in the electrical apparatus, wherein the estimated temperature of the conductor is based on a temperature sensed by a temperature sensing element separated from the conductor by an insulator. Although described with respect to the system in FIG. 1, wherein the electrical apparatus is switchgear, it will be understood that alternative implementations of the method may similarly be implemented for monitoring the condition of other electrical apparatus such as controlgear or power transformer.

At step 500, a non-linear model is stored in storage 306 of thermal monitor 142. It will be understood that the stored non-linear model is in the form of code (i.e., instructions for execution by a processor, whether in the form of source code, object code, etc.) and data (e.g., representing coefficients and other constants of the model) representing the non-linear model such that the non-linear model may be implemented by a processor. According to some embodiments, code and/or data for the non-linear model may be obtained (e.g., downloaded) from a remote server (e.g., of SCADA system 160) via the network interface 310. Alternatively or additionally, for example, code and/or data for the non-linear model may be stored in storage 306 during manufacturing in the thermal monitor 142, or by on-site, local installation.

The non-linear model may be developed or derived through one or more of a number of different methods, which may comprise (1) collecting datasets from test environments, such as from a bushing test setup and/or a test switchgear installation; and (2) using a computing platform to explore, develop, and identify one or more models based on the datasets that are effective in generating a conductor temperature estimate.

For instance, to generate a dataset, a test environment may be configured such that at least one temperature sensor (e.g., a thermocouple) may directly measure the temperature of one or more conductors for which a temperature estimator model is desired, while heat is controllably applied to the one or more conductors and temperature measurements are recorded for one or more temperature sensing elements separated from the respective one or more conductors by an insulator and positioned relative to the one or more conductors as to be implemented in the thermal monitoring system (e.g., embedded in the bushing, such as a bushing 200). For example, an illustrative controlled laboratory test setup for bushing 200 may include a programmable heating resistor and thermocouple in thermal contact with one end of bushing 200 (e.g., the end of conductor 204 (404), such that datasets may be generated from the thermocouple and embedded temperature sensing element 41 (442) measurements as heat is applied to the conductor 204 (404). An illustrative graphical representation of such a dataset may be seen in FIG. 6. For a switchgear test installation, the thermal sensors may be deployed as they would be in an actual installation, while the test installation would be modified to incorporate one or more temperature sensors (e.g., thermocouples or thermistors) to directly measure the temperature of the conductors of interest.

As described, one or more non-linear models for estimating the conductor temperature based on a temperature sensing element measurement may be developed from such datasets. A model may be selected based on minimizing an error metric between the reference (i.e., measured) conductor temperature and model-estimated conductor temperature according to a given criterion. It may be understood that in some embodiments, sensors having different configurations (e.g., embedded in a bushing, surface-mounted on a busbar, at different locations in the switchgear, etc.) may have different optimal non-linear models. For instance, the type of non-linear model may be the same, but they may have different parameters; or the type of non-linear models may be different. In this regard, it may be understood that a non-linear model may comprise one or more sub-models, at least one of which is non-linear. Similarly, a non-linear model, as used herein, may employ or be combined with linear filters (e.g., for smoothing output data, etc.). Thus, the non-linear model stored in thermal monitor 142 may include such different non-linear models corresponding to different thermal sensors in the switchgear, and may also include linear features.

In accordance with some embodiments, an illustrative non-linear model development method comprises non-linear system identification, which may, for example, be based on one or more of the following types of non-linear models: (1) Volterra series models; (2) block structured models, such as a Hammerstein-Wiener Model, which comprises a linear block in series with one or two static non-linear blocks (e.g., an input non-linear block followed by a linear block followed by an output non-linear block); (3) neural network models; (4) NARMAX (Nonlinear AutoRegressive Moving Average Model with eXogenous inputs) models, such as a non-linear ARX (autoregressive with extra input) model which is a non-linear behavior model using dynamic networks such as sigmoid and wavelet; and (5) state-space models, such as a non-linear Grey-Box model, which is obtained by estimating coefficients of nonlinear differential, difference, and state-space equations.

In some embodiments, a computing platform used to explore, develop, and identify one or more models based on the datasets may comprise tools such as the Matlab™ System Identification Toolbox™.

Referring again to FIG. 5, at step 502, at least one temperature measurement value is acquired by a temperature sensor, such as by temperature sensing element 41 and module 42 in cable compartment 110 of switchgear 100.

At step 504, thermal monitor 142 receives from module 42 the at least one temperature measurement value acquired by temperature sensing element 41 and module 42. As described hereinabove, thermal monitor receives the at least one temperature measurement value via wireless module 308, and stores the at least one temperature measurement value in non-volatile storage 306.

At step 506, a conductor temperature estimate is generated by processor 302 executing instructions to apply the non-linear model to the at least one temperature value received from the thermal sensor. This application of the non-linear model to the at least one temperature value may include possibly also processing other previously received and stored temperature measurement values and/or one or more prior estimates of conductor temperature. Determining the estimate may involve calculations and/or may in some embodiments be implemented using one or more look-up tables. Also, it will be understood that, in some embodiments, thermal monitor 142 may not execute the non-linear model following each acquisition of at least one temperature measurement value, but may instead apply the non-linear model periodically, such as based on time and/or having received a predetermined number of temperature measurement values from the thermal sensor. Alternatively or additionally, execution of the non-linear model may be conditioned on the sensed temperature measurement values exceeding a certain threshold and/or exceeding a rate-of-change threshold, and/or changing by more than some threshold from the previous execution of the non-linear model.

At step 508, thermal monitor 142 selectively outputs notifications based on the estimated conductor temperature. For instance, thermal monitor 142 may update conductor temperature data and/or other information displayed on HMI 306 based on the new estimated conductor temperature. In some embodiments, this displayed information may include (i) a notification of an alert or alarm condition based on the estimated conductor temperature (e.g., exceeding a temperature threshold and/or exceeding a temperature rate-increase threshold), and/or (ii) a notification of recommended or required maintenance.

To provide such notifications, processor 302 may execute asset management software (e.g., including failure-prediction or maintenance estimation code) that incorporates and bases determinations and/or conditions on the estimated conductor temperature (e.g., rather than, or in addition to, the temperatures measured by the thermal sensors). Alternatively or additionally, thermal monitor 142 may notify SCADA system 160 and/or certain operators and other personnel via the SCADA system and/or via other communication networks and protocols or platforms (e.g., email, text, cloud, mobile telephone networks, etc.). In some embodiments, such asset management software that incorporates and selectively provide notifications based on the estimated conductor temperature may be alternatively or additionally implemented by SCADA system 160 and/or another processor-based module, such as a supervisory switchgear monitoring module (not shown) in low-voltage compartment 140 that interfaces with thermal monitor 142 (and, for example, with other switchgear monitoring subsystems, and SCADA).

As may be understood, a method according to some embodiments of the present disclosure may comprise a subset of the steps in FIG. 5. By way of non-limiting example, a method according to some embodiments may comprise steps 502, 504, and 506, as may be executed by thermal monitor 142, or, in some alternative embodiments, by SCADA system 160, or by a combination of thermal monitor 142 and SCADA system 160.

It will further be understood, as noted above, that while a common non-linear model may be generated and employed for identical or similarly configured thermal sensors (e.g., as in each of the bushings 200) deployed at different locations in the switchgear, in some embodiments different non-linear models (e.g., same type of model but different constants (e.g., coefficients); or a different type of model) may be employed.

Figure 7:
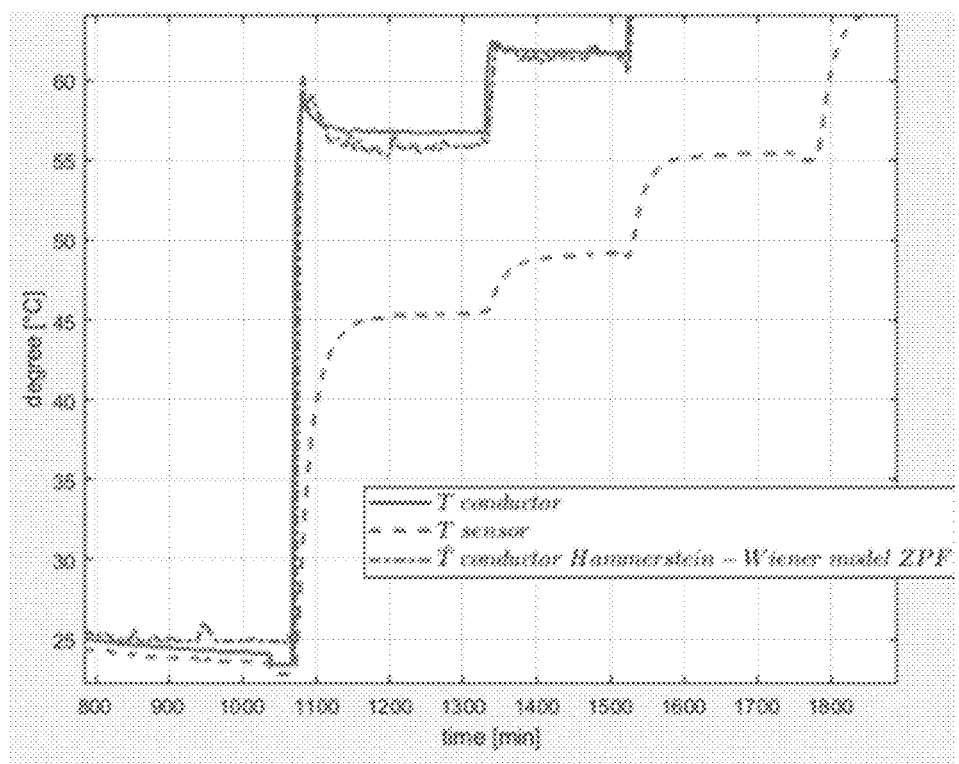
FIG. 7 graphically illustrates an estimated conductor temperature profile according to a non-linear model developed based on the temperature sensor data and conductor temperature data of FIG. 6, in accordance with some embodiments.

By way of non-limiting example, for purposes of illustration, FIG. 7 illustrates an estimated conductor temperature profile according to a non-linear model developed based on the temperature sensor data and conductor temperature data of FIG. 6, using the Matlab™ System Identification Toolbox™. The non-linear model comprises a Hammerstein-Wiener model, with a low-pass (fifth order) zero-phase filter (ZPF) applied to the output of the Hammerstein-Weiner model. As can be seen, this non-linear model accurately estimates the actual measured conductor temperature, including during transients.

More specifically, it can be seen that (i) the amplitude gap (e.g., amplitude difference at steady-state or quasi-steady-state, such as over the 1150 to 1300 minute time period) between the estimated conductor temperature and the measured conductor temperature signal is significantly reduced compared to that between the measured thermal sensor temperature signal the measured conductor temperature signal, (ii) the estimated conductor temperature rise-time (e.g., time elapsed to rise between 10% to 90% of the steady-state response) closely matches that of the measured conductor temperature signal, and (iii) the estimated conductor temperature signal closely matches the measured conductor temperature signal's transient-state shape (e.g., the shape during the overshoot and settling interval). Quantitatively, this model exhibits a goodness of fit equal to 0.9376 (1.0 being the best fit, 0 being the worst for the goodness of fit metric used), and a residuals distribution standard deviation equal to 2.08° C. It is noted that the Hammerstein-Wiener model alone (i.e., without the low-pass ZPF; not shown) exhibited a goodness of fit equal to 0.9303 and a residuals distribution standard deviation equal to 2.33° C. In contrast, a linear model (not shown) exhibited a goodness of fit of 0.779, and a residuals distribution standard deviation equal to 7.39° C., and exhibited a marked rise-up time discrepancy and incapability to follow the transient-state shape.

Although the illustrative Hammerstein-Wiener model with low-pass ZPF (as well as the underlying Hammerstein-Wiener model alone) exhibit very accurate estimation of the conductor temperature (e.g., including during short rise-time and transient intervals of the conductor temperature), it will be understood that alternative non-linear models may be developed. For example, as additional data is acquired (e.g., under varying conditions, in the field), NARMAX and neural networks may be expected to provide robust non-linear models, neural networks being particularly well-suited for continued updating and improvement as further data is aggregated.

Accordingly, it may be understood in view of the foregoing, that an estimated conductor temperature based on a non-linear model and a temperature measured by a temperature sensing element separated from the conductor by an insulator in accordance with some embodiments of the present disclosure provides additional information that may be used and leveraged to improve thermal monitoring of electrical apparatus assets, such as providing for improved detection and/or prediction of critical point degradation or potential failure, enabling more timely and accurate notifications concerning maintenance scheduling and alert and/or alarm conditions to be provided.

For instance, for bushing 200 in FIG. 1, estimating the conductor temperature in accordance with the illustrative embodiments-rather than relying (without such estimation) on the temperature sensed by temperature sensing element 41 (or by a temperature sensing element mounted on the bushing's exterior surface and/or on or in the connector 112a)—better informs the existing condition and predicted failure of the electrical connection between the bushing 200 and the connector 112a for cable 112. In this regard, for example, controlled test-setup characterization of bushing-to-connector contact integrity (e.g., contact resistance, corrosion, failure, etc.) and measured temperature under varying heating profiles may be performed to provide further information as to correlations that may be used to further leverage estimated conductor temperature in electrical asset management systems. Data aggregated from in-field switchgear 100 configured with bushing 200 may likewise be used to further leverage estimated conductor temperature in electrical asset management systems.

Although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. Similarly, the structure and/or function of a component may be combined into a single component or divided among two or more components. In addition, it is specifically contemplated that a particular feature described, either individually or as part of an embodiment, can be combined with other individually described features, or parts of other embodiments. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with claims that are based on the present disclosure, as such claims may be presented herein and/or in any patent applications claiming priority to, based on, and/or corresponding to the present disclosure.

What is claimed is:

1. A method for monitoring the condition of an electrical apparatus based on an estimated temperature of a conductor in the electrical apparatus, the method comprising:
   receiving a measured temperature value from a first thermal sensor disposed in the electrical apparatus and configured to sense temperature at a location separated from the conductor by an insulator, wherein the first thermal sensor is embedded in a bushing;
   generating an estimated conductor temperature value based on applying a non-linear model to the measured temperature value, the estimated conductor measurement value being representative of the temperature of the conductor; and
   monitoring the condition of the electrical apparatus based on the estimated conductor temperature.

2. The method according to claim 1, wherein the non-linear model comprises a Hammerstein Wiener model.

3. The method according to claim 2, wherein the non-linear model includes a zero phase low-pass filter applied to the output of the Hammerstein Wiener model.

4. The method according to claim 1, wherein the measured temperature value is received periodically.

5. The method according to claim 1, wherein the first thermal sensor is configured to sense the temperature of an insulator that is thermally coupled to the conductor.

6. The method according to claim 1, wherein the conductor is a conductive rod of the bushing, wherein the conductive rod is configured for electrical connection to a second conductor external to the bushing.

7. The method according to claim 1, wherein the electrical apparatus is a medium voltage switchgear.

8. The method according to claim 7, wherein the medium voltage switchgear includes at least one processor that executes the method for monitoring the condition of an electrical apparatus based on an estimated temperature of a conductor in the electrical apparatus.

9. The method according to claim 7, wherein the medium voltage switchgear is communicably coupled over a network to a remote processor, and wherein the remote processor executes the method for monitoring the condition of an electrical apparatus based on an estimated temperature of a conductor in the electrical apparatus.

10. At least one non-transitory computer-readable medium comprising code that, when executed by at least one processor, is operative to cause the at least one processor to execute the method according to claim 1.

11. A monitor apparatus configured to monitor the condition of an electrical apparatus based on an estimated temperature of a conductor in the electrical apparatus, the monitor apparatus comprising:
   a memory configured to store a measured temperature value generated by a first thermal sensor disposed in the electrical apparatus and configured to sense temperature at a location separated from the conductor by an insulator, wherein the first thermal sensor is embedded in a bushing; and
   at least one processor configured to generate an estimated conductor temperature value based on applying a non-linear model to the measured temperature value, the estimated conductor measurement value being representative of the temperature of the conductor; and
   wherein the at least one processor is further configured to monitor the condition of the electrical apparatus based on the estimated conductor temperature.

12. The monitor apparatus according to claim 11, wherein the non-linear model comprises a Hammerstein Wiener model.

13. The monitor apparatus according to claim 12, wherein the non-linear model includes a zero phase low-pass filter applied to the output of the Hammerstein Wiener model.

14. The monitor apparatus according to claim 11, wherein the first thermal sensor is configured to sense the temperature of an insulator that is thermally coupled to the conductor.

15. The monitor apparatus according to claim 11, wherein the conductor is a conductive rod of the bushing, wherein the conductive rod is configured for electrical connection to a second conductor external to the bushing.

16. The monitor apparatus according to claim 11, wherein the electrical apparatus is a medium voltage switchgear.

17. The monitor apparatus according to claim 16, wherein the monitor apparatus is located in the medium-voltage switchgear.

18. The monitor apparatus according to claim 16, wherein the medium voltage switchgear is communicably coupled over a network to the monitor apparatus.

* * * * *